(12) United States Patent
Wang et al.

(10) Patent No.: US 6,752,507 B2
(45) Date of Patent: Jun. 22, 2004

(54) BACKLIGHT MODULE STRUCTURE

(75) Inventors: Chih-Yuan Wang, Taichung Hsien (TW); Kuo Jui Huang, Chia-Yi Hsien (TW)

(73) Assignee: Wintek Corporation, Taichung (TW)

(*) Notice: Subject to any disclaimer, the term of this patent is extended or adjusted under 35 U.S.C. 154(b) by 0 days.

(21) Appl. No.: 10/191,566

(22) Filed: Jul. 10, 2002

(65) Prior Publication Data

US 2004/0008504 A1 Jan. 15, 2004

(51) Int. Cl.⁷ .................................................. F21V 7/04
(52) U.S. Cl. ........................ 362/31; 362/561; 362/224; 362/260; 362/330
(58) Field of Search .......................... 362/31, 561, 223, 362/224, 260, 330

(56) References Cited

U.S. PATENT DOCUMENTS 4,345,308 A * 8/1982 Mouyard et al. ........... 362/332
4,640,592 A * 2/1987 Nishimura et al. ......... 385/125

* cited by examiner

*Primary Examiner*—Sandra O'Shea
*Assistant Examiner*—Sharon Payne
(74) *Attorney, Agent, or Firm*—Rosenberg, Klein & Lee

(57) ABSTRACT

A backlight module structure is including a photoconductive element. The top of the photoconductive element has an outgoing face formed with numerous microstructures. An optical transforming layer is overlaid on the outgoing face of the photoconductive element between the outgoing face and the liquid crystal module. A solid powder material is mixed with a polymer binder and adhered to a transparent substrate to form the optical transforming layer. The solid powder material includes at least a lighting material.

6 Claims, 7 Drawing Sheets

US 6,752,507 B2

BACKLIGHT MODULE STRUCTURE

BACKGROUND OF THE INVENTION

A present invention is related to a backlight module structure including a photoconductive element. An optical transforming layer is overlaid on the photoconductive element. The optical transforming layer has a predetermined color and includes a lighting material.

FIG. 8 shows an existent photoconductive module 90 applied to liquid crystal. LED or CCFL (cold cathode fluorescent lamp) serves as a light source 91 used in backlight-type photoconductive technique of electronic product (such as mobile phone). The light beam emitted from a point light source or linear light source passes through a scattering layer 94 connected on outgoing face 922 of the photoconductive element 92. A brightening layer 95 is laid on the scattering layer 94. The photoconductive face 921 of the photoconductive element 92 and the reflective layer 96 thereunder serve to convert the point light source or linear source into a face light source outgoing from the outgoing face 922 to the liquid crystal module 97. When reaching the scattering layer 94, the light beam is evened. Then, the light beam reaches the brightening layer 95, whereby the liquid crystal module 97 can display backlight with predetermined color.

Conventionally, the backlight color of the liquid crystal display depends on the color of the light source 91. For example, when a blue backlight of the liquid crystal display is desired, a blue light source 91 is needed. When an orange backlight of the liquid crystal display is desired, an orange light source 91 is needed. Therefore, in order to achieve various backlight colors, it is necessary to use various colors of light sources 91 in the electronic product.

With respect to the backlight of colored liquid crystal display, generally the white backlight is desired for achieving better brightness. However, white light source has higher price so that blue, green, orange or red light source is selected to lower cost. Under such circumstance, it is necessary to convert the color into white light.

Moreover, the outgoing face 922 of the photoconductive element 92 of such conventional photoconductive module 90 only has simple pattern of microstructure 923. In accordance with the manufacturing technique, the angle γ contained by the reflective face 924 of the microstructure 923 and the outgoing face 92 is too large —(as shown in FIG. 9. Therefore, it is uneasy to concentrate and reflect the light beam coming from the light source 91 onto the reflective board 96. As a result, the light beam reflected from the reflective board 96 to the liquid crystal module 97 is reduced so that the displayed brightness is reduced.

SUMMARY OF THE INVENTION

It is therefore a primary object of the present invention to provide a backlight module structure including a photoconductive element. An optical transforming layer is overlaid on the photoconductive element. The optical transforming layer includes a lighting material, whereby the optical transforming layer can absorb the light beam of a light source and transform the light beam into a specific color of light so as to change the color of the displayed backlight. The optical transforming layer absorbs the light beam from the light source and releases energy within a specific optical wavelength distribution. This increases the brightness of light in perpendicular direction. Therefore, as a whole, the brightness of the backlight of the display is enhanced.

It is a further object of the present invention to provide the above backlight module structure in which by means of the angle contained between the microstructure of the photoconductive element and the outgoing face thereof, the light beam from the light source is conducted by the photoconductive element in a predetermined direction. Therefore, when reflected, the light beam is concentrated without being deflected so as to enhance the brightness of the backlight.

The present invention can be best understood through the following description and accompanying drawings wherein:

DETAILED DESCRIPTION OF THE PREFERRED EMBODIMENTS

Figure 1:
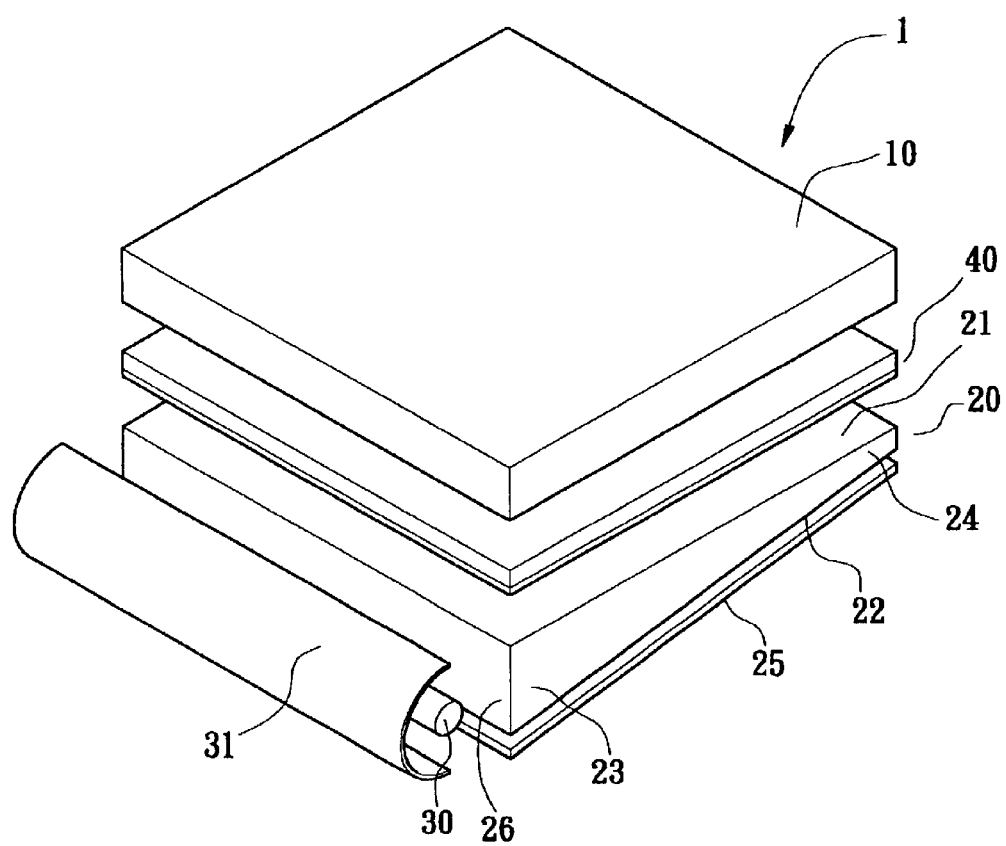
FIG. 1 is a perspective view of the structure of the present invention.

Please refer to FIGS. 1 to 4. The backlight module of the present invention is disposed on a backlight-type liquid crystal display 1. The liquid crystal display 1 has a liquid crystal module 10. The backlight module is disposed at the bottom of the liquid crystal module 10. The backlight module has a photoconductive element 20 disposed at the bottom of the liquid crystal module 10. The photoconductive element 20 is made of transparent material. The top section of the photoconductive element 20 has an outgoing face 21 formed with numerous microstructures 211. The microstructure 211 has a peak point 212 farthest from the outgoing face 21. The microstructure 211 inclinedly radially extends from the peak point 212. All the tangents of outer faces of the microstructure 211 are not parallel to each other. One side of the peak 212 is formed with a steep slope 213, while the other side of the peak 212 opposite to the steep slope 213 is formed with a gradual slope 214. The tangent of the gradual slope 214 and the outgoing face 21 contain an angle α. The tangent of the steep slope 213 and the outgoing face 21 contain an angle β larger than the angle α. In addition, the bottom of the photoconductive element 20 is formed with an inclined photoconductive face 22. The thickness of the photoconductive element 20 is tapered in accordance with the photoconductive face 22 to form a thick end 23 and a thin end 24. A reflective layer 25 is disposed at the bottom of the photoconductive face 22. An incoming face 26 is formed on a lateral face of the thick end 23. A light source 30 is disposed on one side of the incoming face 26 distal from the thin end 24. (The light source can be an LED or a CCFL with a specific color.) One side of the light source 30 distal from the photoconductive element 20 is provided with an arched reflective mirror 31. In addition, an optical transforming layer 40 is overlaid on the outgoing face 21 of the photoconductive element 20. The optical transforming layer 40 is composed of a solid powder material 41, a polymer binder 42 and a transparent substrate 43. The solid powder material 41 is a mixture of a lighting material 411 and an optical powder 412. The optical powder 412 can be acryl powder, $TiO_2$, $SiO_2$ or $BaTiO_3$. The concentration is 10~50% weight percentage. The polymer binder 42 can be epoxy resin, polyamide resin, acryl resin, polyester resin, polyether resin, halogen resin, rubber, silicone resin or cellulose resin. The concentration is 20~90% weight percentage. The transparent substrate 43 is made of a material with zero opaqueness (100% transparency).

It should be noted that the gradual slope 214 of the microstructure 211 of the outgoing face 21 enlarges the curvature of a lateral outer face of the microstructure 211. That is, the angle α of the gradual slope 214 is smaller than the angle γ of the microstructure of the conventional photoconductive element. Therefore, the photoconductive element 20 of the present invention is able to concentratively conduct the light of the light source 30 in a predetermined direction. Accordingly, the displayed brightness of the liquid crystal module 10 is increased.

In addition, the solid powder material 41 is mixed with the polymer binder 42 and adhered to the transparent substrate 43 to form the optical transforming layer 40. The lighting material 411 of the solid powder material 41 is able to absorb and transform the light beam to emit a light beam within a specific optical wavelength distribution. Therefore, a part of the light beam from the light source 30 directly passes through the optical transforming layer 40, while another part of the light beam is absorbed by the lighting material 411 and released in a form of light within a specific wavelength distribution. Accordingly, the light beam is transformed into another color. Therefore, the displayed color of the liquid crystal module 10 is different from the light source. The lighting material 411 absorbs the light beam from the light source 30 and releases energy within a specific optical wavelength distribution. This increases the displayed brightness of the liquid crystal module 10.

Figure 10:
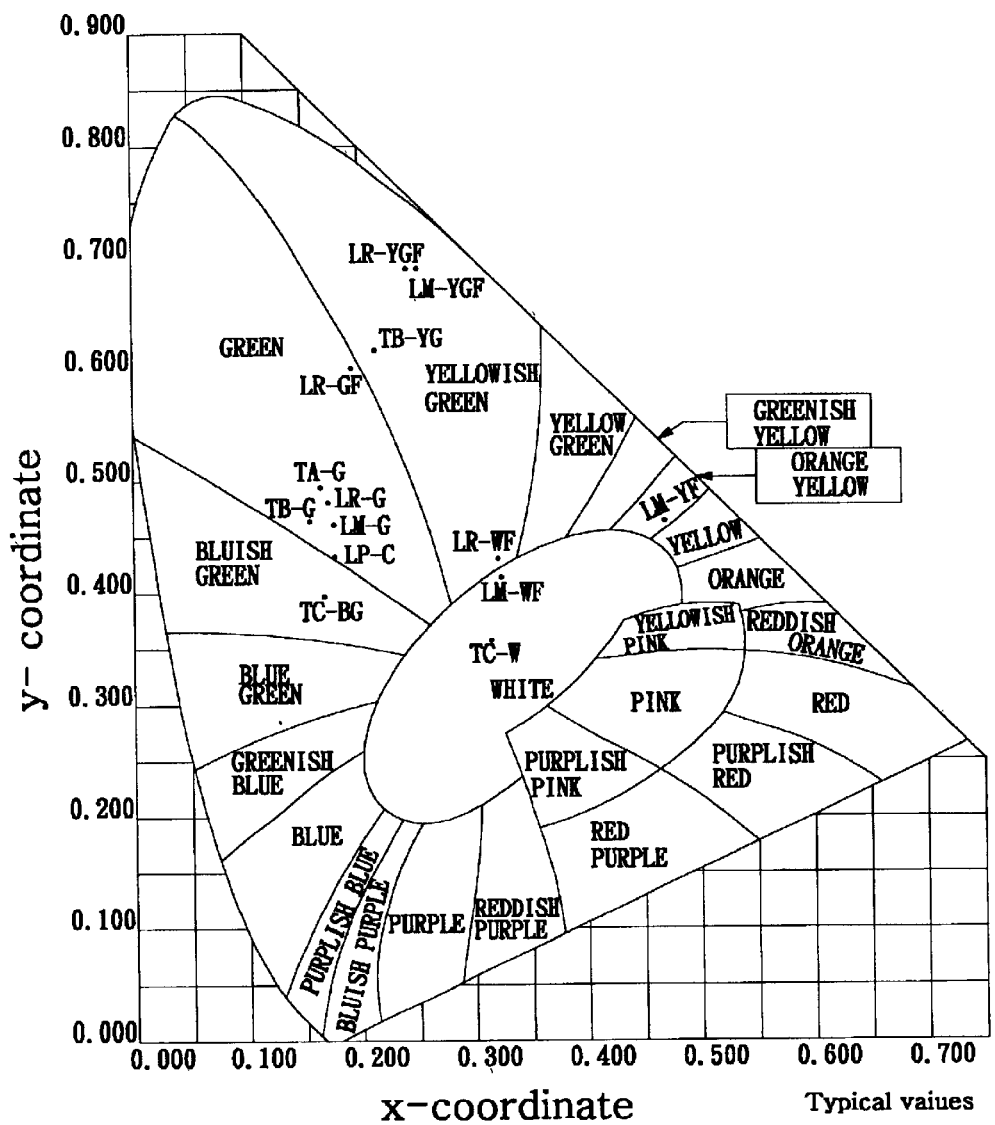
FIG. 10 is a CIE chromaticity diagram.

In addition, referring to the CIE chromaticity diagram of FIG. 10, when it is desired to display purple backlight on the liquid crystal display from a blue light source 30, a red optical transforming layer 40 should cooperate with the light source. Similarly, when it is desired to display white backlight on the liquid crystal display from a blue light source 30, an orange optical transforming layer 40 should cooperate with the light source.

Figure 2:
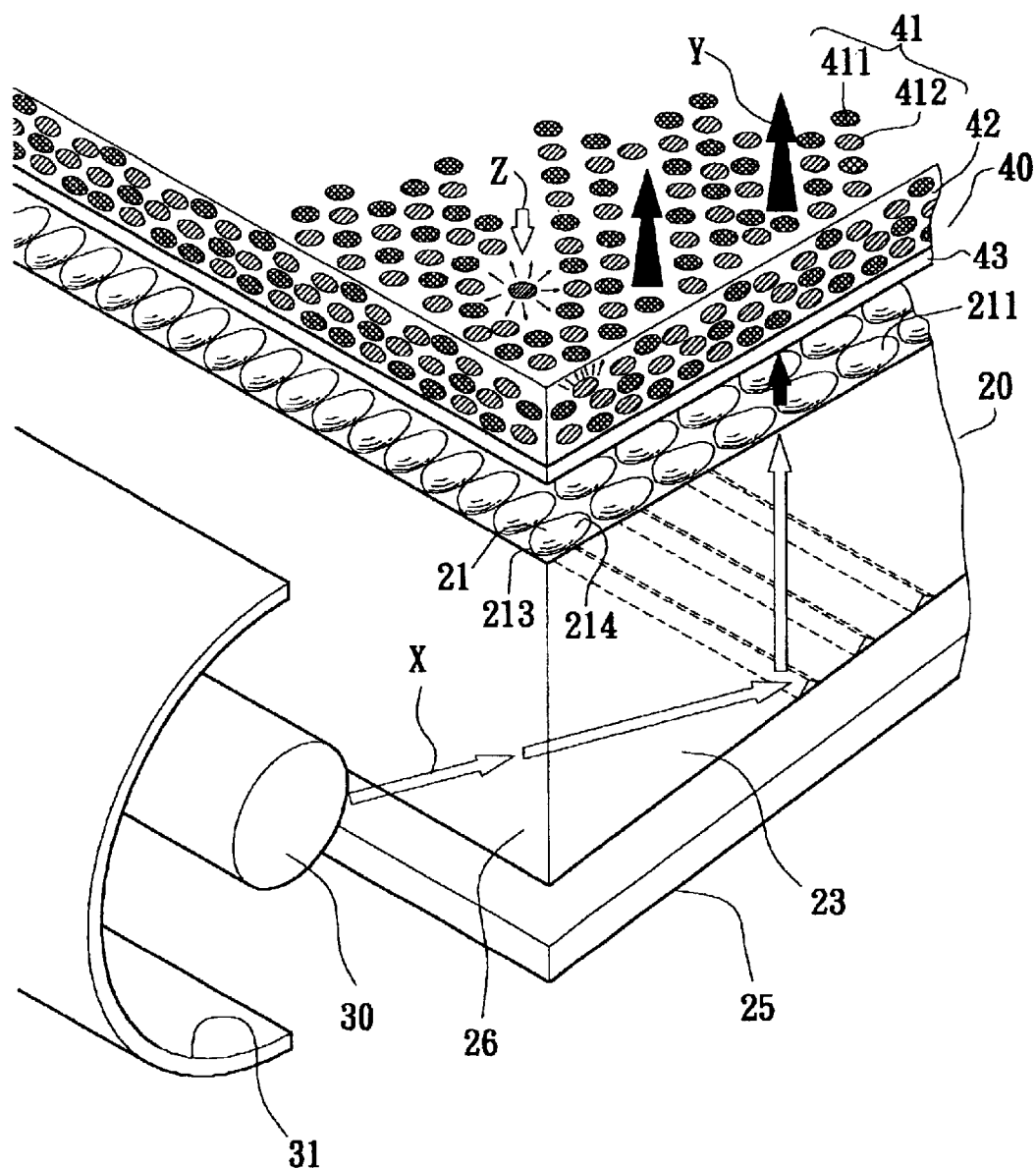
FIG. 2 is a perspective view showing the path of the light beam in the present invention.
Figure 3:
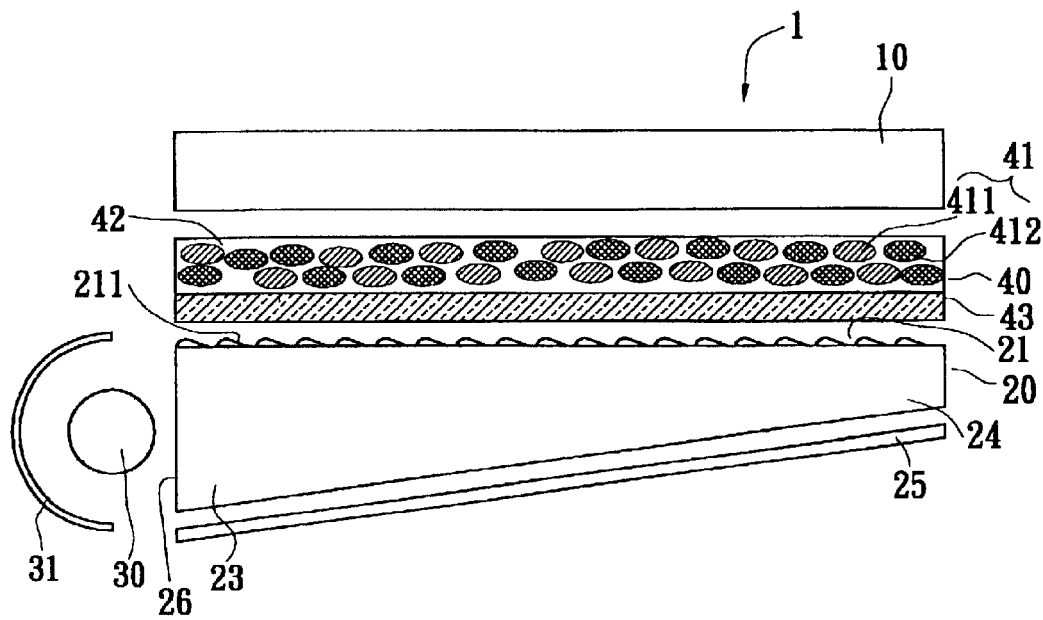
FIG. 3 is a side view of the present invention.
Figure 4:
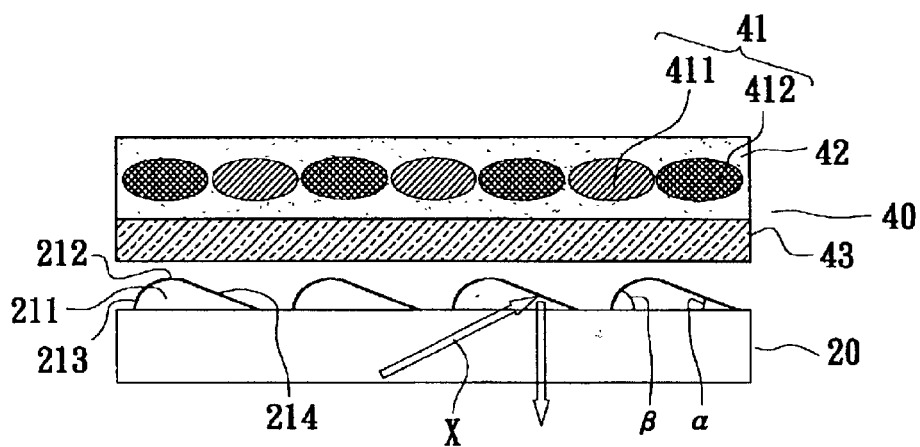
FIG. 4 is a side view showing that the light beam is reflected by the microstructure of the present invention.
Figure 5:
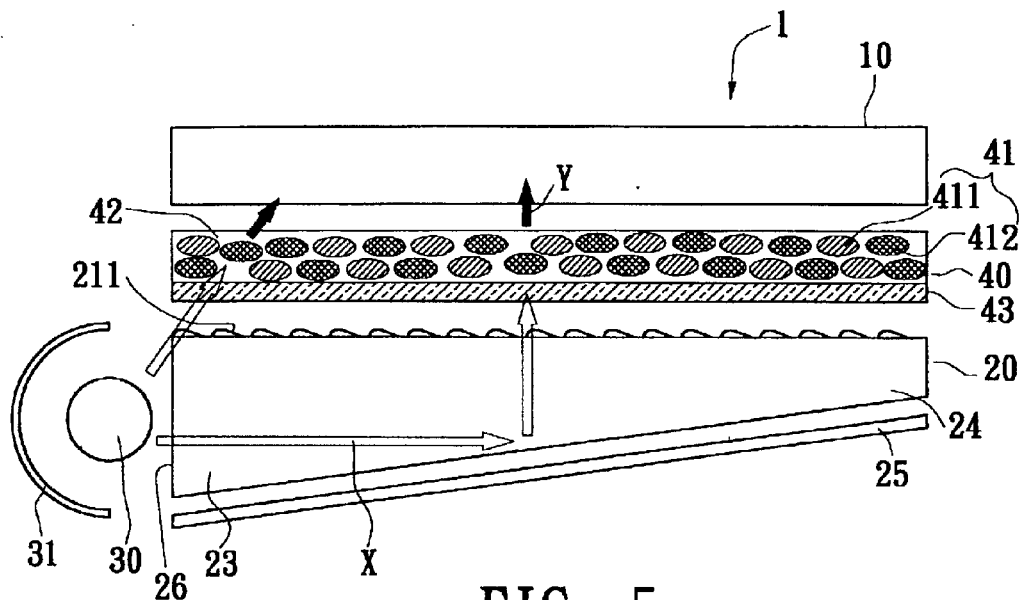
FIG. 5 is a side view showing that the internal light beam is color-changed by the optical transforming layer of the present invention.
Figure 6:
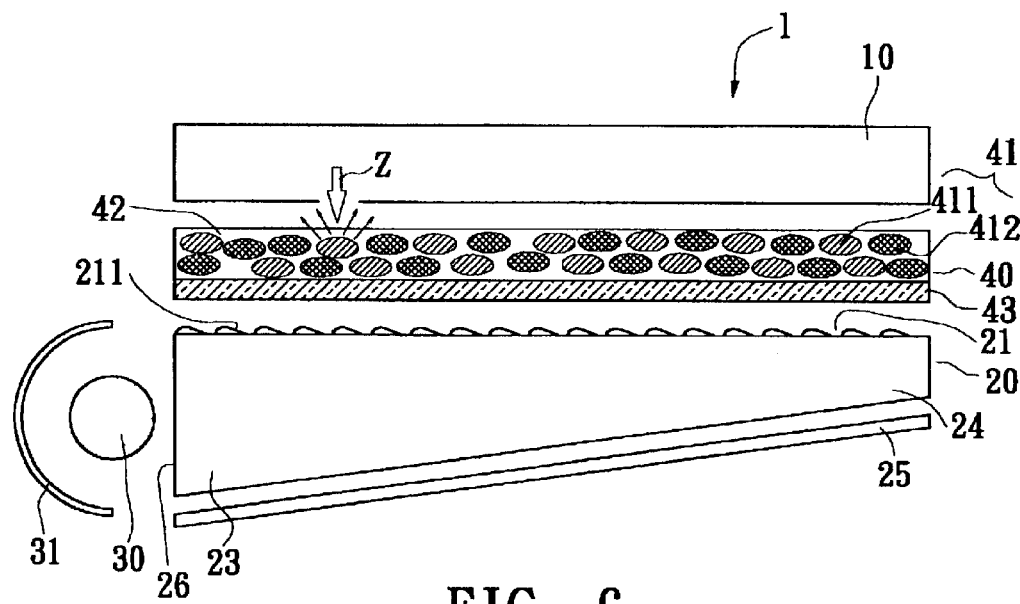
FIG. 6 is a side view showing that the external light beam is brightened by the brightening layer of the present invention.
Figure 7:
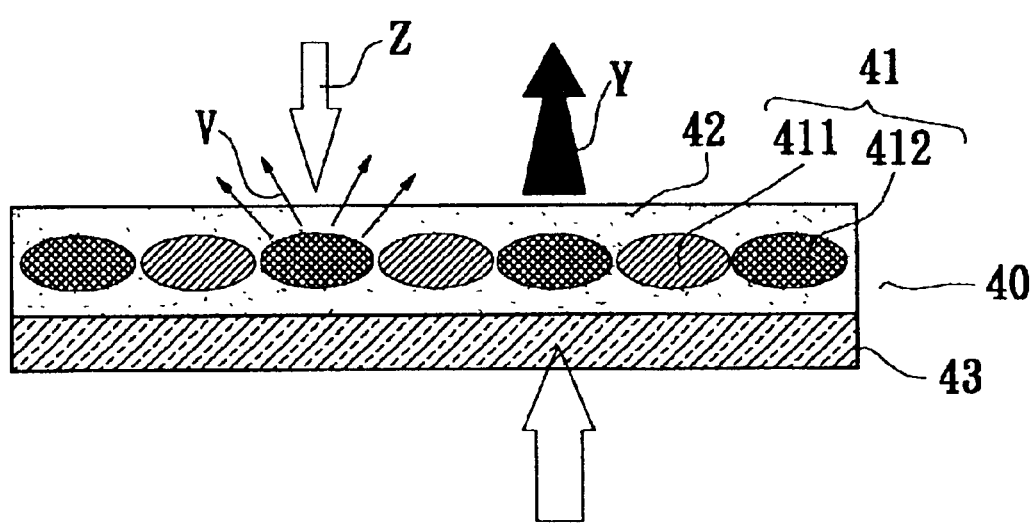
FIG. 7 is an enlarged view according to FIG. 6, showing that the light beam is color-changed and brightened in the color-transforming layer of the present invention.
Figure 8:
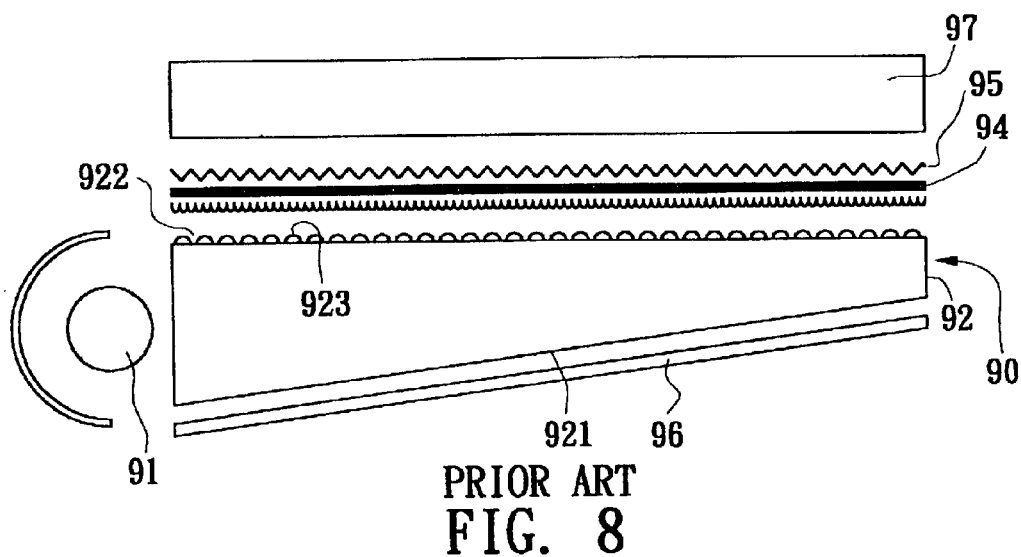
FIG. 8 shows the scattering film and color changing film of a conventional photoconductive element.
Figure 9:
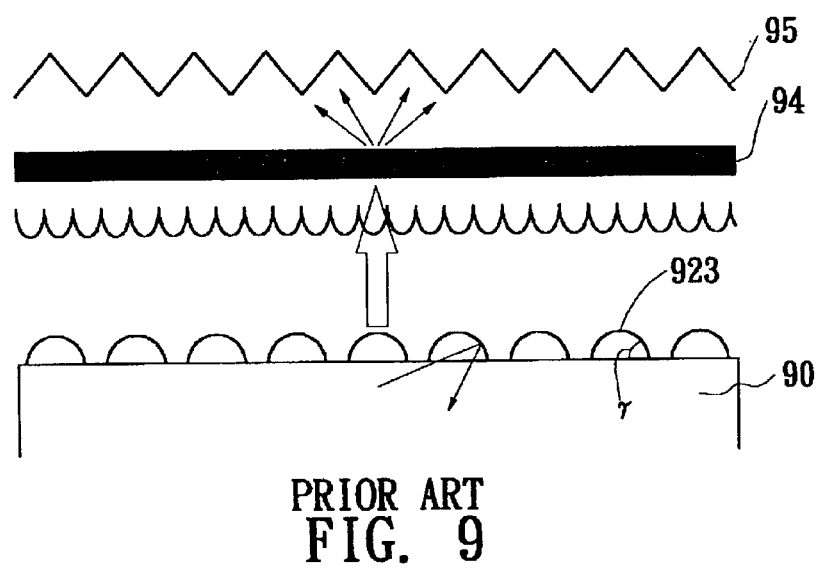
FIG. 9 shows that the light beam is reflected, color-changed and scattered by the conventional photoconductive element.

Please refer to FIG. 2. The present invention is applicable to the photoconductive element 20 of an electronic product such as a mobile phone or a PDA panel. In use, the light beam X emitted from the light source 30 (which in this embodiment is a blue LED) is directly projected onto the incoming face 26 of the photoconductive element 20 or is reflected by the reflective mirror 31 onto the incoming face 26. The light beam X is refracted or directly projected to the outgoing face 21. Before going out from the backlight module, the light beam X previously passes through the optical transforming layer 40 (which in this embodiment is orange) and is transformed into color-changed light Y (white light, with reference to FIG. 5). At the same time, a part of the light beam X is absorbed by the lighting material 411 of the optical transforming layer 40 and an energy within a specific optical wavelength distribution is released. This first time brightens the color-changed light Y In addition, the color-changed light Y passes through the optical powder 412 and the rough surface (not shown) of the optical powder 412 serves to provide a focusing effect for the color-changed light Y (as shown in FIG. 7 as the focusing effect of a convex lens). At this time, the color-changed light Y is second time brightened. The color-changed light Y further passes through the liquid crystal module 10, whereby the liquid crystal display 1 displays a color-changed backlight. The focusing effect makes the backlight displayed by the liquid crystal display has better brightness.

With one single LED as the light source 30, under 3.5V driving voltage, the light of the light source 30 passing through the backlight module and the color transforming film is color-changed and 3~4 times brightened. The comparison in brightness and colority is shown by the following table:

| Actual product | description | brightness cd/m² | CIE chromaticity coordinate x | y |
|---|---|---|---|---|
| Comparison A | one blue LED backlight | 8.27 | 0.134 | 0.079 |
| actual product A1 | adding optical transforming layer 10 | 23.4 | 0.222 | 0.212 |
| actual product A2 | adding optical transforming layer 20 | 27.8 | 0.283 | 0.288 |
| actual product A3 | adding optical transforming layer 30 | 30.2 | 0.294 | 0.299 |
| actual product A4 | adding optical transforming layer 40 | 32.2 | 0.357 | 0.361 |

With three single LED as the light source 30, under 3.5V driving voltage, the light of the light source 30 passing through the backlight module and the color transforming film is color-changed and 8~11 times brightened. The comparison in brightness and chromaticity is shown by the following table:

| Actual product | description | brightness cd/m² | CIE chromaticity coordinate x | y |
|---|---|---|---|---|
| Comparison B | three blue LED backlight | 21.4 | 0.133 | 0.067 |
| actual product B1 | adding optical transforming layer 10 | 171 | 0.276 | 0.283 |
| Actual product B2 | adding optical transforming layer 20 | 216 | 0.320 | 0.323 |
| Actual product B3 | adding optical | 198 | 0.316 | 0.325 |

-continued

| Actual product | description | brightness cd/m² | CIE chromaticity coordinate | |
|---|---|---|---|---|
| | | | x | y |
| Actual product B4 | transforming layer 30 adding optical transforming layer 40 | 247 | 0.379 | 0.384 |

In addition, the light beam Z of external light source (such as sunlight or fluorescent lamp) outside the liquid crystal display 1 passes through the liquid crystal module 10 and reaches the optical powder 412 of the photoconductive element 21. The light beam Z is reflected and scattered by the numerous projections of the surfaces of numerous optical powders 412 to form scattered light V reflected back to the liquid crystal module 10 (as shown in FIG. 7). This increases the displayed brightness and evenness of the liquid crystal module 10.

In conclusion, the optical transforming layer 40 of the photoconductive element 21 changes the color of the light beam from the light source 30 and brightens the light. Depending on the different colors of the light source 30 and the optical transforming layer 40, the backlight color can be varied. Moreover, the rough faces of the optical powders 412 scatter and reflect the light from external light source and focus the light from the internal light source 30 so as to increase the displayed brightness and evenness of the liquid crystal module 10. Accordingly, not only the color of the backlight of the liquid crystal display 1 can be changed, but also the brightness of the backlight can be increased. Therefore, the displayed brightness will not be reduced and the visible illumination of the display is increased.

In cooperation with the color of the light beam from the light source, the present invention can achieve a desired backlight color. The optical transforming layer of the present invention can increase the brightness of the backlight. In structure, cost for the scattering film and the color transforming film is saved. Therefore, the backlight module of the present invention is commercially applicable to mobile phone, PDA and other electronic products.

The present invention has the following advantages:
1. Having optical color transforming function: The optical transforming layer is disposed on the photoconductive element. The optical transforming layer includes numerous lighting materials for absorbing the light beam and transforming the light beam into a light with specific color. Therefore, the color of the light beam can be changed.
2. Having brightening effect: The optical transforming layer is disposed on the photoconductive element. The optical transforming layer includes numerous mixed lighting materials and optical powders which can increase the brightness of light in perpendicular direction. Therefore, as a whole, the brightness of the backlight of the display is enhanced.

The above embodiments are only used to illustrate the present invention, not intended to limit the scope thereof. Many modifications of the above embodiments can be made without departing from the spirit of the present invention.

What is claimed is:

1. A backlight module structure comprising a photoconductive element made of transparent material, a top section of the photoconductive element having an outgoing face formed with a plurality of microstructures, the bottom of the photoconductive element being formed with a photoconductive face, an incoming face being formed on a lateral face of the photoconductive element, a light source being disposed on one side of the incoming face, an optical transforming layer being overlaid on the outgoing face of the photoconductive element, the optical transforming layer being composed of a solid powder material, a polymer binder and a transparent substrate.

2. The backlight module structure as claimed in claim 1, wherein the microstructure has a peak point farthest from the outgoing face, the microstructure inclinedly radially extending from the peak point, all the tangents of outer faces of the microstructure being not parallel to each other, one side of the peak being formed with a steep slope, while the other side of the peak opposite to the steep slope being formed with a gradual slope, the tangent of the gradual slope and the outgoing face containing a first angle, the tangent of the steep slope and the outgoing face containing a second angle which is larger than the first angle.

3. The backlight module structure as claimed in claim 1, wherein the photoconductive face of the bottom of the photoconductive element is inclined, whereby the thickness of the photoconductive element is tapered in accordance with the photoconductive face to form a thick end and a thin end.

4. The backlight module structure as claimed in claim 1, wherein an arched reflective mirror is disposed on one side of the light source distal from the photoconductive element.

5. The backlight module structure as claimed in claim 1, wherein the polymer binder is one of epoxy resin, polyamide resin, acryl resin, polyester resin, polyether resin, halogen resin, rubber, silicone resin and cellulose resin, the concentration thereof being 20~90% weight percentage.

6. The backlight module structure as claimed in claim 1, wherein the solid powder material further includes an optical powder which is one of acryl powder, $TiO_2$, $SiO_2$ and $BaTiO_3$, the concentration thereof being 0.5~50% weight percentage.

* * * * *